United States Patent
Aljadeff et al.

(10) Patent No.: US 9,633,551 B2
(45) Date of Patent: Apr. 25, 2017

(54) ENHANCED WIRELESS LOCATION SYSTEM AND METHOD

(71) Applicant: AeroScout Ltd., Rehovot (IL)

(72) Inventors: Daniel Aljadeff, Kiriat Ono (IL); Guy M. Duxbury, Ottawa (CA); Robert D. McCulloch, Ottawa (CA)

(73) Assignee: AeroScout Ltd., Ness-Ziona (IL)

( * ) Notice: Subject to any disclaimer, the term of this patent is extended or adjusted under 35 U.S.C. 154(b) by 0 days.

(21) Appl. No.: 14/535,836

(22) Filed: Nov. 7, 2014

(65) Prior Publication Data

US 2015/0137946 A1   May 21, 2015

Related U.S. Application Data

(60) Provisional application No. 61/906,541, filed on Nov. 20, 2013.

(51) Int. Cl.
  *G08B 25/10* (2006.01)
  *G06K 19/07* (2006.01)
  *G06K 19/077* (2006.01)

(52) U.S. Cl.
  CPC ......... *G08B 25/10* (2013.01); *G06K 19/0716* (2013.01); *G06K 19/07749* (2013.01)

(58) Field of Classification Search
  CPC ........... G06K 7/10366; G06K 19/0723; G06K 2017/0045; G06K 7/0008; G06K 7/10376; G06K 19/07749
  USPC .......................................................... 340/8.1
  See application file for complete search history.

(56) References Cited

U.S. PATENT DOCUMENTS

| | | | | |
|---|---|---|---|---|
| 6,058,374 A | * | 5/2000 | Guthrie | G01D 4/004 705/28 |
| 2004/0100392 A1 | * | 5/2004 | Brillon | G07C 9/00309 340/12.51 |

OTHER PUBLICATIONS

Uli Fichter, European Search Report, Mar. 27, 2015, Munich, Germany.
Annex to the European Search Report on European Patent Application No. EP 14 19 3573.

* cited by examiner

*Primary Examiner* — Mark Blouin
(74) *Attorney, Agent, or Firm* — Adan Ayala

(57) ABSTRACT

An identification tag has at least a controller, a receiver for receiving wireless signals from an exciter, and a transmitter for transmitting wireless signals to at least one location receiver (which may be a WLAN access point). The tag's controller can determine the presence of interference from sources unrelated to the location system, such as smartphones, tablets, computer monitors etc., and signal an alert accordingly.

21 Claims, 2 Drawing Sheets

ENHANCED WIRELESS LOCATION SYSTEM AND METHOD

CROSS-REFERENCE TO RELATED APPLICATION

The present application derives priority from U.S. Patent Application No. 61/906,541, filed on Nov. 20, 2013, now pending, which is hereby incorporated in whole by reference.

FIELD

This invention relates generally to location systems and more particularly with location systems which provide the location of an asset or person with high reliability and accuracy.

BACKGROUND

Location systems can be used in sites to locate an asset in a defined area. Such asset could be a piece of equipment, a person, etc. Some location systems can show the real time location of an asset but also the exact room number in which it is located at a given time with high reliability. This is specifically required in large building floor areas that are divided into many small rooms such as in hospital buildings.

U.S. Pat. No. 6,963,289, which is hereby incorporated by reference, teaches an exemplary wireless local area network (WLAN) real time location system (RTLS). Such system may include a radio frequency identification (RFID) tag that transmits RF signals on a WLAN channel in order to allow the tag's location to be calculated. This is typically done using RSSI (receive signal strength indication) or TOA (time of arrival) measurements of the radio signal that is transmitted by the tag. The signal is received by several location receivers and/or WLAN access points that are in different positions, and special mathematical algorithms are implemented to calculate the tag's location. Further elaboration of these systems and methods can be found in U.S. Pat. No. 6,968,194 and US Patent Publication No. 2004/0203870, which are hereby incorporated by reference.

Such systems may also include a low frequency transmitter (sometimes referred to as an "exciter"), which periodically transmits a beacon signal. Such beacon signals may include a room or exciter ID information. Such an exciter may be positioned at the entrance to a room or at a perimeter boundary, so that it triggers every tag that enters or leaves the room or the perimeter boundary. When the tag receives the beacon signal, it transmits a WLAN message that reports the room and/or exciter ID information to the location system. Further elaboration of these systems and methods can be found in U.S. Pat. No. 7,403,108, which is hereby incorporated by reference.

SUMMARY

An identification tag is disclosed that has at least a controller, a receiver for receiving wireless signals from an exciter, a transmitter for transmitting wireless signals to at least one location receiver (which may be a WLAN access point). The tag's controller can determine the presence of interference from sources unrelated to the location system, such as smartphones, tablets, computer monitors etc., and signal an alert accordingly.

DETAILED DESCRIPTION

Figure 1:
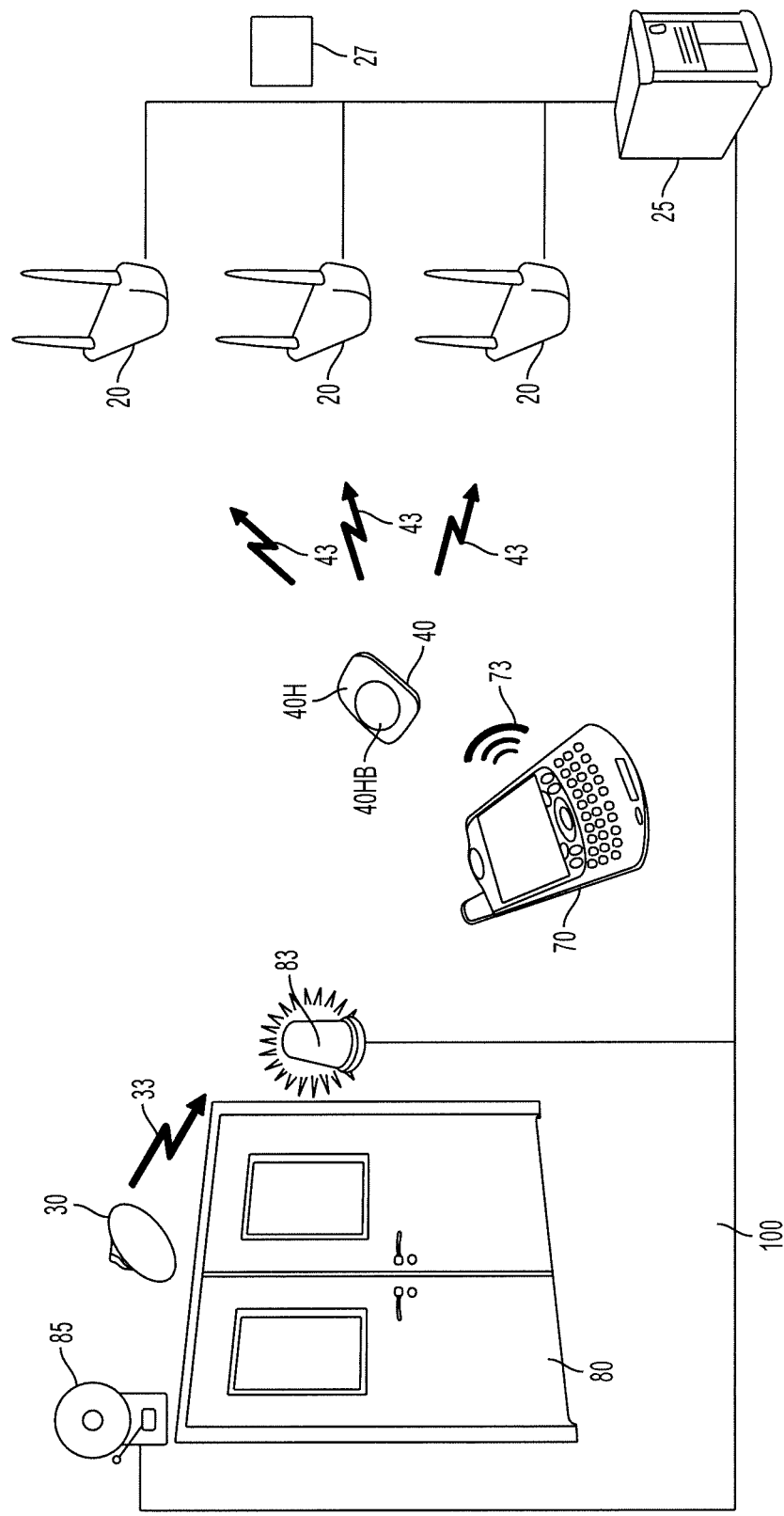
FIG. 1 depicts a wireless location system.

Referring to FIG. 1, a location system 100 may be installed in an area. Location system 100 may include at least one location receiver 20 disposed within the area. Location receiver(s) 20 may be connected to a local area network 27. Location system 100 may also include at least one exciter 30 disposed within the area.

Exciter 30 may be a short range (normally some predefined range under 10 meters) transmitter. Such exciter 30 may be a low frequency RFID transmitter, transmitting at a frequency of about 125 kHz, but it could be of any other type and transmit at other frequencies (e.g. HF and VHF) without departing from the spirit and scope of the present invention. Other embodiments may use exciters which transmit beacons using non-RF technologies (e.g. ultrasound or infrared signals). Accordingly, the term "exciter" hereinafter refers to any device, normally a short range transmitter, and not just low frequency radio devices.

Each exciter 30 preferably broadcasts messages 33 continuously. These messages 33 may include an exciter identification number (e.g., "001" for exciter no. 1) and/or an area identification number (e.g., "0004" for area no. 4). Persons skilled in the art shall recognize that such information may be disposed in a broadcasted numerical string which can follow a predetermined format recognizable by the location system 100 or components thereof.

An identification tag 40 near exciter 30 preferably receives message 33. In response to such message 33, the tag 40 may wake up if tag 40 was in a sleep mode. Tag 40 broadcasts a radio message 43, preferably a WLAN message when a WLAN channel is clear.

Alternatively (or additionally) tag 40 may broadcast message 43 periodically. Such message 43 may include a tag identification number (e.g., "0010" for tag no. 10) and part of (if not the entire) message 33. Persons skilled in the art will recognize that message 43 effectively says "this is tag no. 10 reporting that I'm near exciter no. 1 [and/or area no. 4]." Such information may be disposed in a broadcasted numerical string which can follow a predetermined format recognizable by the location system 100 or components thereof. Tag 40 could also broadcast a message 43 that includes the tag identification number (e.g., "0010" for tag no. 10), and possibly other telemetry information, such as interference-related data, battery status, tamper status, etc., without including any information related to message 33, for example, where tag 40 is not within proximity of exciter 30.

Such message 43 will be preferably received by at least one of location receivers 20, which may send the message 43 as well as measured RSSI, TOA and/or other tag related information to server 25. Server 25 in turn uses such information to calculate the location of tag 40 within the area.

Once server 25 calculates the location of tag 40, server 25 can provide such location data to another server, software package, etc., or even use that location data to control different aspects within the area. For example server 25 can control a door 80 so that, if the tag 40 is calculated to be in a restricted area, server 25 can lock door 80 so that tag 40 cannot move beyond such area or unlock door 80 so that tag 40 can only move towards a particular area. Server 25 can also turn on or off lights 83 and/or alarm 85.

Figure 2:
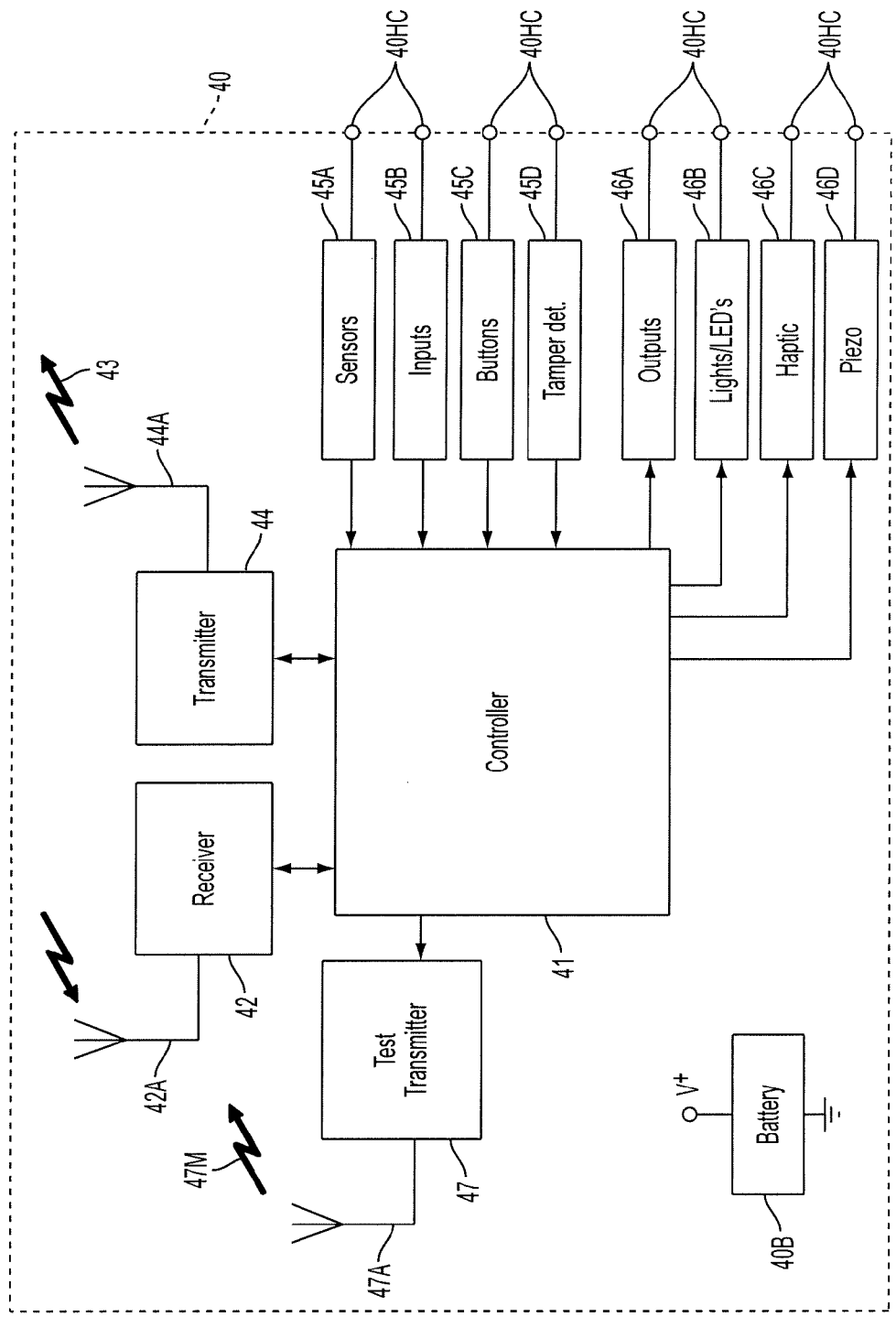
FIG. 2 is a block diagram depicting of an element of the wireless location system of FIG. 1.

Referring to FIG. 2, tag 40 may have a controller 41, a receiver 42 connected to the controller 41 for receiving messages 33 from exciter 30, and a transmitter 44 connected to the controller 41 for transmitting messages 43. Receiver 42 and transmitter 44 may have antennae 42A, 44A, respectively. Preferably antennae 42A, 44A are located within the housing 40H of tag 40, though persons skilled in the art will recognize that at least one antenna could be located outside of the housing 40H and connected to receiver 42 and/or transmitter 44 via a connector (not shown).

Controller 41 may receive inputs from sensor(s) 45A, which may include tamper sensors, skin proximity sensors (e.g. capacitance sensors), temperature sensors, humidity sensors, smoke sensors, carbon monoxide sensors, motion sensors, lanyard presence sensors, pull-cord presence sensors, etc. Such sensor(s) 45A may be located within the housing 40H, though persons skilled in the art will recognize that at least one sensor 45A could be located outside of the housing 40H and connected to controller 41 via a connector 40HC.

Controller 41 may receive inputs from input circuit(s) 45B, which may include receivers that receive input signals from hospital equipment, seatbelt sensors, pressure pad sensors, bed pressure pad sensors, etc. Such input circuit(s) 45B may be located within the housing 40H and receive the input signals wirelessly from the different outside sensors. Alternatively, at least one outside sensor could be connected to at least one input circuit 45B via a connector 40HC.

Controller 41 may receive inputs from button input circuit(s) 45C, which may include buttons 40HB disposed on housing 40H, such as panic buttons, etc. Input circuit(s) 45B may be located within the housing 40H and receive the input signals wirelessly from the different outside sensors. Alternatively, at least one button outside of housing 40H could be connected to at least one button input circuit 45C via a connector 40HC.

Controller 41 may receive inputs from a tamper detection circuit(s) 45D located within or disposed outside of the housing 40H. Alternatively, a tamper detection sensor could be connected to the tamper detection circuit 45D via a connector 40HC.

Controller 41 may also output signals via output circuit 46A, which can be connected to a system outside of tag 40 via connector 40HC. Controller 41 may also turn on/off light or LED displays 46B, drive haptic feedback mechanisms 46C, and/or speakers or piezos 46D. Preferably, light or LED displays 46B, haptic feedback mechanisms 46C, and/or speakers or piezos 46D are disposed within housing 40H. Persons skilled in the art will recognize that the light or LED displays 46B, haptic feedback mechanisms 46C, and/or speakers or piezos 46D may be disposed alternatively outside housing 40H and connected to the controller 41 via connectors 40HC.

Persons skilled in the art shall recognize that tag 40 may have a battery 40B for supplying power as necessary to the different elements within tag 40, as well as other elements described in U.S. Pat. No. 6,963,289, such as sniffer circuits, battery status circuits, storage circuits, etc., either incorporated within controller 41 or in addition to the elements shown in FIG. 2.

Persons skilled in the art will recognize that, if exciter 30 transmits message 33 in a low frequency band, the reception of message 33 by tag 40 could be affected and/or corrupted by a low frequency interference 73 emitted by a device 70, which could include smartphones, tablets, computer monitors, CRT computer monitors, power supplies, power inverters, motors, fixed passive RFID readers, light power saving systems, TV screens, etc. Accordingly, it is preferable to provide a means to determine when such interference 73 is present.

Controller 41 can begin an interference determination process if receiver 42 receives one or a certain amount of unreadable or undecodable messages. If receiver 42 receives a relatively constant signal, controller 41 can assume that it is receiving an interference signal 73 from device 70 or from other sources. Controller 41 can then signal an alert via the outputs 46A, light or LED displays 46B, haptic feedback mechanisms 46C, and/or speakers or piezos 46D, or even transmit a special message 43 identifying the presence of the interference 73.

On the other hand, if receiver 42 receives a short signal (such as an abbreviated version of exciter message 33), controller 41 can assume that message 33 is unreadable or undecodable because of being almost out of range from exciter 30. Controller 41 can then signal an alert via the outputs 46A, light or LED displays 46B, haptic feedback mechanisms 46C, and/or speakers or piezos 46D, or even send a special message 43 noting the weak signal or out of range status.

Tag 40 may also be provided with a test transmitter 47 to assist in the interference determination process. During a time when receiver 42 is not receiving any messages 33, controller 41 could turn on test transmitter 47 to transmit a message 47M in the same frequency as messages 33. Preferably, test transmitter 47 can transmit the message 47M on a periodic basis. Preferably the test transmitter 47 will transmit a weak signal, at a magnitude close to the minimum threshold for which receiver 42 will respond to (i.e. receiver sensitivity).

If receiver 42 does not receive message 47M or receives an unreadable or undecodable signal instead, controller 41 can determine that receiver performance is degraded, whether from radio interference 73, or the presence of nearby magnetic fields or metal, etc. degrading receiving antenna performance. Controller 41 can then signal an alert via the outputs 46A, light or LED displays 46B, haptic feedback mechanisms 46C, and/or speakers or piezos 46D, or even transmit a special message 43 identifying the reduction of receiver performance and/or presence of the interference 73. Such alerts and/or messages 43 could even be sent at an increased rate. Sending such alert status could indicate to server 25 that such tag 40 needs to be tracked more closely. Sending messages 43 more often could allow server 25 to maintain a closer watch of the position of tag 40. Accordingly server 25 could raise an alert, etc., if tag 40 approaches an exit or critical location change, such as changing floors, wings or moving from a storage room for dirty equipment to a storage room for clean equipment. Persons skilled in the art will recognize that server 25 could recognize such location changes as the status of the different locations can be programmed into a map file used by server 25.

Persons skilled in the art will recognize that controller 41 can choose to not signal the alert(s) depending upon other inputs. For example, for a tag 40 configured to be an infant tag, if controller 41 determines that the receiver performance is degraded, controller 41 can choose to not signal the alert(s) when motion sensor 45A signals that tag 40 is not in motion. Controller 41 can interpret such lack of motion to mean that the infant is not at risk of abduction because the infant (and tag 40) is not moving toward an exit. Because of such lack of risk, controller 41 may determine that it is not critical to signal the alert(s). Such determination could result in an extended battery life for tag 40 as tag 40 would not be transmitting the alert messages.

Once server 25 receives an interference alert, server 25 can take different actions, such as locking door 80, turning on/off lights 83, turning on/off alarm 85, turning on/off a video camera (not shown), etc., as well as instructing exciter 30 to increase the intensity of its transmission power for transmitting a message 33, in an attempt to overpower the interference 73.

In a preferred embodiment, exciter output power can be selectively increased to improve the signal-to-noise-ratio received by portable device receivers that are experiencing interference (as these devices approach exciters). By only selectively increasing exciter output power, the time that exciters are transmitting at higher output power is reduced, therefore possibly mitigating any potential drawbacks of increased exciter power.

Persons skilled in the art may recognize other additions or alternatives to the means disclosed herein. For example, depending upon the exciter type, tag 40 could experience interference in those communications. In other words, if exciter 30 broadcasts messages 33 in ultrasound or infrared frequencies to be received by tag 40, tag 40 could experience ultrasound or infrared interference. The methodology disclosed herein can be used in detecting, signal and/or reacting to such interference. All these additions and/or alterations are considered to be equivalents of the present invention.

What is claimed is:

1. An identification tag for use in a location system, comprising:
   a controller;
   a receiver for receiving wireless signals from an exciter; and
   a transmitter for transmitting wireless signals to at least one location receiver;
   wherein the controller determines a presence of interference from sources unrelated to the location system, and causes the transmitter to transmit an alert signal.

2. The identification tag of claim 1, wherein the at least one location receiver is a WLAN access point.

3. The identification tag of claim 1, wherein the receiver receives wireless signals transmitted at a frequency of about 125 kHz.

4. The identification tag of claim 1, wherein an antenna is connected to the receiver.

5. The identification tag of claim 1, wherein the transmitter transmits a wireless signal indicative of proximity to the exciter.

6. The identification tag of claim 1, wherein an antenna is connected to the transmitter.

7. The identification tag of claim 1, wherein the controller receives inputs from at least one sensor.

8. The identification tag of claim 7, wherein the at least one sensor is selected from the group consisting of tamper sensors, skin proximity sensors, capacitance sensors, temperature sensors, humidity sensors, smoke sensors, carbon monoxide sensors, motion sensors, lanyard presence sensors and pull-cord presence sensors.

9. The identification tag of claim 1, wherein the controller receives inputs from at least one input circuit.

10. The identification tag of claim 9, wherein the at least one input circuit includes at least one of the group consisting of tamper detection circuits, button input circuits, receivers that receive input signals from at least one of the group consisting of hospital equipment, seatbelt sensors, pressure pad sensors, and bed pressure pad sensors.

11. The identification tag of claim 1, wherein the controller determines a presence of interference from sources unrelated to the location system when the tag receives at least one of an undecodable message and a constant signal.

12. The identification tag of claim 1, further comprising a test transmitter for transmitting a test message, wherein the controller determines a presence of interference from a source unrelated to the location system when the tag does not successfully receive the test message.

13. The identification tag of claim 1, wherein the receiver receives one of RF signals, LF signals, ultrasound signals and infrared signals.

14. The identification tag of claim 11, wherein the source of interference is one of a smartphone, tablet, computer monitor, CRT computer monitor, power supply, power inverter, motor, fixed passive RFID reader, light power saving system and TV screens.

15. The identification tag of claim 1, wherein the identification tag is attached to a baby.

16. A location system, comprising:
    a system server;
    an exciter connected to the system server;
    a location receiver connected to the system server; and
    an identification tag comprising a controller, a receiver for receiving wireless signals from the exciter, and a transmitter for transmitting wireless signals to the location receiver;
    wherein the controller determines a presence of interference from sources unrelated to the location system, and causes the transmitter to transmit an alert signal.

17. The location system of claim 16, wherein the transmitter transmits a wireless signal indicative of proximity to the exciter.

18. The location system of claim 16, wherein the controller determines a presence of interference from sources unrelated to the location system when the tag receives at least one of an undecodable message and a constant signal.

19. The location system of claim 16, further comprising a test transmitter for transmitting a test message, wherein the controller determines a presence of interference from a source unrelated to the location system when the tag does not successfully receive the test message.

20. The location system of claim 16 wherein said alert signal is used by said system server to modify the transmission power of at least one exciter in said location system.

21. The location system of claim 16 wherein said alert signal is used by said system server to take at least one action of locking a door, turning on/off lights, turning on/off alarm and turning on/off a video camera.

* * * * *